United States Patent
Furuta et al.

(10) Patent No.: US 11,325,461 B2
(45) Date of Patent: May 10, 2022

(54) VEHICLE

(71) Applicant: MITSUBISHI JIDOSHA KOGYO KABUSHIKI KAISHA, Tokyo (JP)

(72) Inventors: Katsuhiro Furuta, Tokyo (JP); Hideo Matsunaga, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 16/450,411

(22) Filed: Jun. 24, 2019

(65) Prior Publication Data

US 2019/0389302 A1 Dec. 26, 2019

(30) Foreign Application Priority Data

Jun. 25, 2018 (JP) .............................. JP2018-120090

(51) Int. Cl.
*F01P 11/16* (2006.01)
*F01P 7/12* (2006.01)
(Continued)

(52) U.S. Cl.
CPC .............. *B60K 11/085* (2013.01); *F01P 7/12* (2013.01); *F01P 7/165* (2013.01); *F01P 11/16* (2013.01); *G01K 3/005* (2013.01)

(58) Field of Classification Search
CPC .......... F01P 11/16; F01P 2031/32; F01P 7/12; F01P 2031/00; F01P 2031/20; F01P 11/10
See application file for complete search history.

(56) References Cited

U.S. PATENT DOCUMENTS

2011/0137530 A1   6/2011   Kerns
2012/0106590 A1*  5/2012   Suzuki .................... F01P 11/16
                                                          374/1
(Continued)

FOREIGN PATENT DOCUMENTS

CN    102161312 A    8/2011
JP    2015-129460 A  7/2015
(Continued)

OTHER PUBLICATIONS

Chinese Office Action dated Jan. 6, 2022 in corresponding Chinese Application No. 201910549136.0 with an English Translation.
(Continued)

*Primary Examiner* — Long T Tran
(74) *Attorney, Agent, or Firm* — Birch, Stewart, Kolasch & Birch, LLP

(57) ABSTRACT

A vehicle includes:
a radiator that cools cooling water;
a grille shutter that is provided on a vehicle front side of the radiator and opens or closes a grille provided in a vehicle;
a first flow path in which the cooling water passes through the radiator;
a second flow path in which the cooling water does not pass through the radiator;
a thermostat that switches a path between the first flow path and the second flow path; and
a failure determiner that performs failure determination of the thermostat based on an actual temperature of the cooling water and an estimated temperature of the cooling water, the estimated temperature being calculated based on a temperature change of the cooling water caused by an open or close state of the grille shutter.

4 Claims, 4 Drawing Sheets

(51) Int. Cl.
    *B60K 11/08*     (2006.01)
    *G01K 3/00*     (2006.01)
    *F01P 7/16*     (2006.01)

(56) References Cited

U.S. PATENT DOCUMENTS

| | | |
|---|---|---|
| 2013/0073150 A1 | 3/2013 | Kerns |
| 2015/0088364 A1* | 3/2015 | Sakayori .................. F01P 11/16     701/29.7 |
| 2015/0191078 A1* | 7/2015 | Miyaji ................. B60K 11/085     701/49 |
| 2017/0030274 A1* | 2/2017 | Nakanishi ................ F01P 11/16 |
| 2017/0227421 A1* | 8/2017 | Kuhara .................... F01P 11/16 |
| 2018/0073423 A1* | 3/2018 | Speichinger ........ G01M 15/048 |

FOREIGN PATENT DOCUMENTS

| | | |
|---|---|---|
| JP | 5888413 B2 | 3/2016 |
| JP | 2017-137814 A | 8/2017 |
| JP | 2017-171138 A | 9/2017 |
| WO | WO 2013-168529 A1 | 11/2013 |

OTHER PUBLICATIONS

Japanese Office Action dated Feb. 22, 2022 issued in corresponding Japanese Application No. 2018-120090 with an English Translation.

* cited by examiner

VEHICLE

CROSS REFERENCE TO RELATED APPLICATION

This application is based on Japanese Patent Application No. 2018-120090 filed on Jun. 25, 2018, the contents of which are incorporated herein by reference.

BACKGROUND OF THE INVENTION

1. Technical Field

The present invention relates to a vehicle.

2. Related Art

For vehicles including automobiles, a cooling system including a thermostat, a radiator, and the like is known for cooling a power source such as an engine.

In such a cooling system, in order to adjust a temperature of cooling water which cools the power source, it is generally controlled whether to make the cooling water flow in the radiator by using a thermostat. However, when the thermostat fails, temperature control may not be successfully carried out.

Therefore, there is known a configuration in which a failure diagnosis unit for performing a failure diagnosis of a thermostat using a temperature of cooling water flowing in a cooling system is provided (see, for example, JP-A-2017-171138 and JP-A-2015-129460).

In order to adjust a temperature of cooling water flowing in a radiator, a configuration is known in which an open or close state is controlled by providing an openable grille shutter on a front side of a vehicle (for example, refer to JP-A-2017-171138, JP-A-2015-129460, and JP-A-2017-137814).

In the configuration in which the grille shutter is opened or closed as described above, for example, even when the thermostat is stuck open, the temperature is hard to fall if the grille shutter is closed and this causes a problem that it is difficult to perform a failure diagnosis of the thermostat.

The invention has been made based on problems described above and an object of the invention is to provide a thermostat failure diagnosis unit with high detection accuracy even when a grille shutter is used in combination.

SUMMARY OF INVENTION

According to an aspect of the invention, a vehicle includes:

a radiator that cools cooling water;

a grille shutter that is provided on a vehicle front side of the radiator and opens or closes a grille provided in a vehicle;

a first flow path in which the cooling water passes through the radiator;

a second flow path in which the cooling water does not pass through the radiator;

a thermostat that switches a path between the first flow path and the second flow path; and a failure determiner that performs failure determination of the thermostat based on an actual temperature of the cooling water and an estimated temperature of the cooling water, the estimated temperature being calculated based on a temperature change of the cooling water caused by an open or close state of the grille shutter.

According to the invention, it is possible to provide a thermostat failure diagnosis unit with high detection accuracy even when a grille shutter is used in combination.

DESCRIPTION OF EMBODIMENTS

Hereinafter, as an embodiment of the invention, a vehicle 100 provided with a failure diagnosis unit 30 for a thermostat 20 will be described.

In the embodiment, the description of the detailed functions and operations of an internal combustion engine and a steering of the vehicle and other various parts not directly related to the invention will be omitted as appropriate.

In the embodiment, a case of using a water-cooled engine as a drive source is particularly described. However, the invention is not limited to this configuration and temperature control of refrigerants other than water may be performed using a thermostat.

Figure 1:
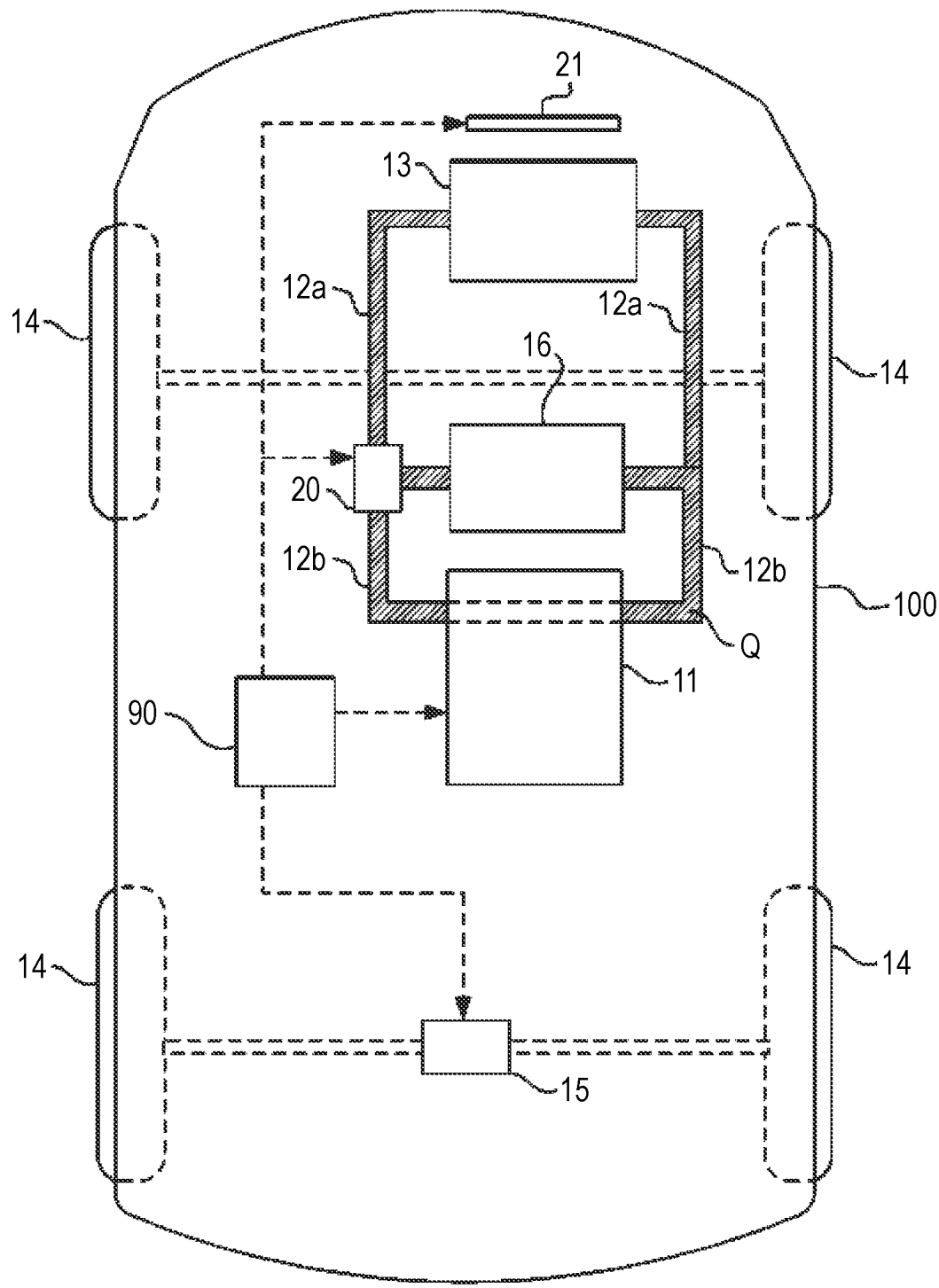
FIG. 1 is a view illustrating an example of a part of a configuration of a vehicle as an embodiment of the invention.

As illustrated in FIG. 1, the vehicle 100 includes an engine 11 as a driving source, a flow path 12 through which a cooling water Q for cooling the engine 11 flows, and a radiator 13 for cooling the cooling water Q by making the cooling water Q pass therethrough.

The vehicle 100 also includes a grille shutter 21 which opens and closes a grille at the front of the vehicle ahead of the radiator 13 and the thermostat 20 which switches the flow path 12 of the cooling water Q between a flow path 12*a* where the path passes through the radiator 13 and a flow path 12*b* where the path does not pass through the radiator 13. The grille shutter 21 adjusts the travelling wind supplied to the radiator by opening or closing and contributes to the temperature adjustment of the radiator.

The vehicle 100 also includes a vehicle speed sensor, an automatic transmission 15 for transmitting power from the engine 11 to a tire 14, a pump 16 serving as a circulator for circulating the cooling water Q in the flow path 12, and an ECU 90 serving as a control unit which controls each part of the vehicle 100.

The ECU 90 has a function as a control unit for controlling the vehicle 100 and is a microcomputer including mainly a CPU.

Figure 2:
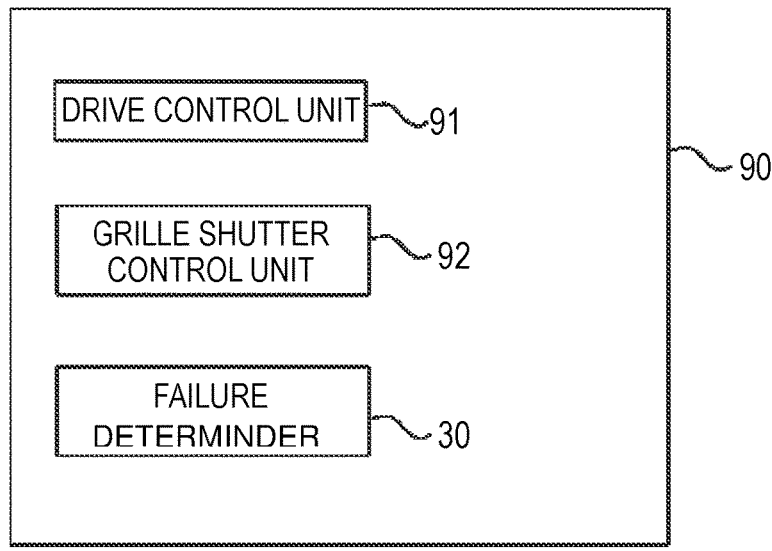
FIG. 2 is a diagram illustrating an example of a functional configuration of a control unit illustrated in FIG. 1.
Figure 3:
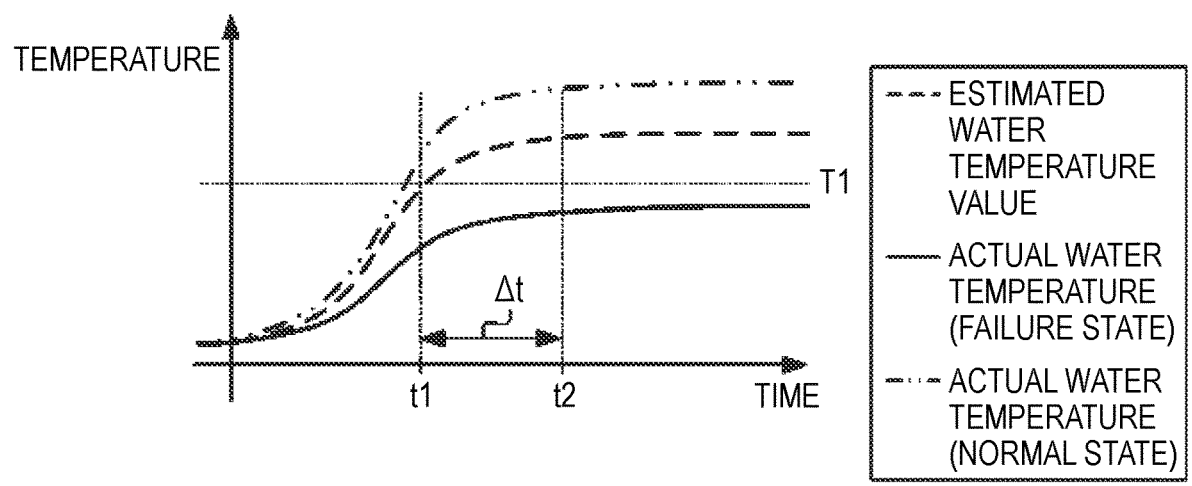
FIG. 3 is a diagram illustrating an example of temperature control of cooling water.

As illustrated in FIG. 2, the ECU 90 includes a drive control unit 91 which controls an operation of the automatic transmission 15 and the engine 11, a grille shutter control unit 92 which controls an opening and closing operation of the grille shutter 21 described below, and the failure determiner 30 which performs failure determination of the thermostat 20.

The function of the ECU 90 is not limited to such a configuration. For example, rotation control of the engine 11 or control of a fan attached to the radiator 13 may be performed.

The thermostat 20 is provided at a junction of the flow paths 12a and 12b and functions as a flow path switching unit for switching the flow path between the flow path 12a and the flow path 12b.

Specifically, the thermostat 20 performs control so that the cooling water Q flows into the radiator 13 by opening the flow path 12a side when the actual temperature or the estimated water temperature value of the cooling water Q reaches a predetermined thermostat opening temperature T1. The actual temperature of the cooling water is detected based on a temperature detection unit, specifically, a temperature sensor.

The estimated water temperature value referred to here is the water temperature estimated from the engine heat generation amount and heat release amount. The failure determiner 30 performs temporary failure determination at a time t1 at which the estimated water temperature reaches the thermostat opening temperature T1. When the actual water temperature does not reach the thermostat opening temperature T1 at a determination time t2 after a given time Δt elapses from the time t1, failure determination is performed, and when the actual water temperature reaches the thermostat opening temperature T1 at the determination time t2, it is determined as normality.

The thermostat opening temperature T1 may be any temperature in design, but may be, for example, 77° C.

The radiator 13 is a heat exchanger in which the heat of the cooling water Q exchanges heat with the outside air through a surface of the radiator 13 by the cooling water Q flowing inside.

In the embodiment, when the grille shutter 21 is in an open state, the cooling performance of the radiator 13 is increased by the increase in the flow rate of air which strikes the surface of the radiator 13.

On the other hand, when the grille shutter 21 is in a closed state, the flow rate of the air striking the surface of the radiator 13 is reduced, so the cooling performance of the radiator 13 is reduced as compared with a case of the open state.

In a normal state, the grille shutter 21 opens and closes according to a vehicle speed, in such a manner that the grille shutter 21 adjusts the temperature of the cooling water Q and contributes to the improvement of the fuel efficiency by reducing the air resistance of the vehicle 100.

Specifically, in the closed state, the aerodynamic characteristics of the vehicle 100 are improved, and in the open state, the air resistance of the vehicle 100 is increased, while the cooling performance of the radiator 13 is improved.

Figure 4:
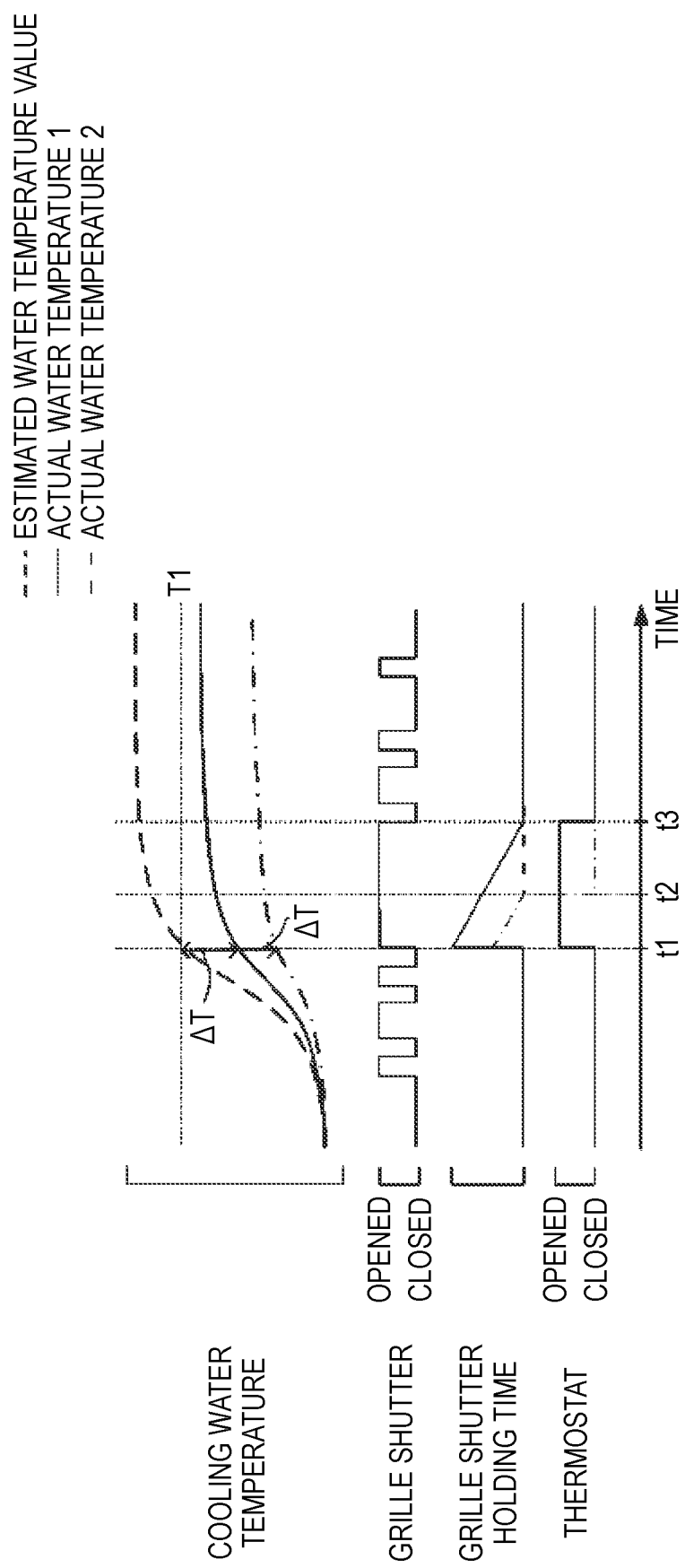
FIG. 4 is a diagram illustrating an example of temperature control and thermostat control.

In the normal state in which all the devices operate normally, for example, as illustrated in FIG. 4, the ECU 90 controls the opening and closing of the grille shutter 21 and the thermostat 20 based on the estimated water temperature value or the actual water temperature. The temperature of the cooling water Q is controlled by opening or closing the grille shutter 21 and the thermostat 20.

However, When the failure (here, a failure pattern due to an open stuck state is described, but is not limited to such failure) of the thermostat 20 occurs, for example, even if it is detected that the estimated water temperature value exceeds the thermostat opening temperature T1 and the thermostat 20 is opened, there is a concern that the actual water temperature may not rise sufficiently as illustrated by the solid line in FIG. 4.

In such a case, a method for the failure determiner 30 to determine a failure will be described with reference to FIGS. 4 and 5.

In the following description, only a case where the vehicle 100 shifts from a stop state to a travelling state and the temperature of the cooling water Q gradually rises will be described for simplicity, but the invention is not limited to this operation.

In an initial state, the vehicle 100 is in the stop state and the actual temperature of the cooling water Q is sufficiently low, so the thermostat 20 should be closed. The actual water temperature of the cooling water Q is heated by the operation of the engine 11 and gradually rises.

When the ECU 90 detects that the estimated water temperature value exceeds the thermostat opening temperature T1 (Step S101), the ECU 90 instructs the opening of the thermostat 20 (Step S102).

When the thermostat 20 operates normally, the estimated water temperature value is an ideal value estimated from the engine heat generation amount and the heat release amount and is generally set to indicate a temperature lower than the actual water temperature.

That is, when the actual water temperature does not reach the thermostat opening temperature T1 at a primary failure determination time t1 at which the primary failure determination is performed, it is assumed that thermostat 20 was already opened from the stop state and the cooling water Q flowed into the radiator 13 with the flow path 12a side open.

Here, in the embodiment, at the primary failure determination time t1 at which the estimated water temperature value reaches the thermostat opening temperature T1, the failure determiner 30 performs the primary failure determination as a temporary failure determination assuming that the actual water temperature does not reach the thermostat opening temperature T1 (Step S103). That is, the embodiment is configured to "perform the primary failure determination when the estimated temperature exceeds a predetermined value".

In Step S103, when the actual water temperature reaches the thermostat opening temperature T1, the failure determiner 30 determines that the thermostat 20 operates normally and continues the processing and control in the normal state (Step S201).

In the embodiment, in order to simplify the description, a time point at which the estimated water temperature value reaches the thermostat opening temperature T1 is taken as the primary failure determination time t1 and it is determined whether the actual water temperature reaches the thermostat opening temperature T1 at the primary failure determination time t1. However, the invention is not limited to this configuration. For example, it may be determined that the system operates normally on condition that the actual water temperature reaches a predetermined temperature.

In the failure determination of the thermostat 20, as described above, the determined is made based on whether the actual water temperature reaches the predetermined temperature, thus high or low in the cooling capacity of the radiator 13 affects the determination. As already described, since the cooling performance by the radiator 13 changes depending on the open and close state of the grille shutter 21, the failure determiner 30 may not be able to correctly perform the failure determination without considering whether the grille shutter 21 is open or closed.

Here, in the embodiment, the failure determiner 30 performs the failure determination of the thermostat 20 considering not only the actual water temperature and the estimated temperature of the cooling water Q but also the temperature change of the cooling water based on the open or close state of the grille shutter 21.

Figure 5:
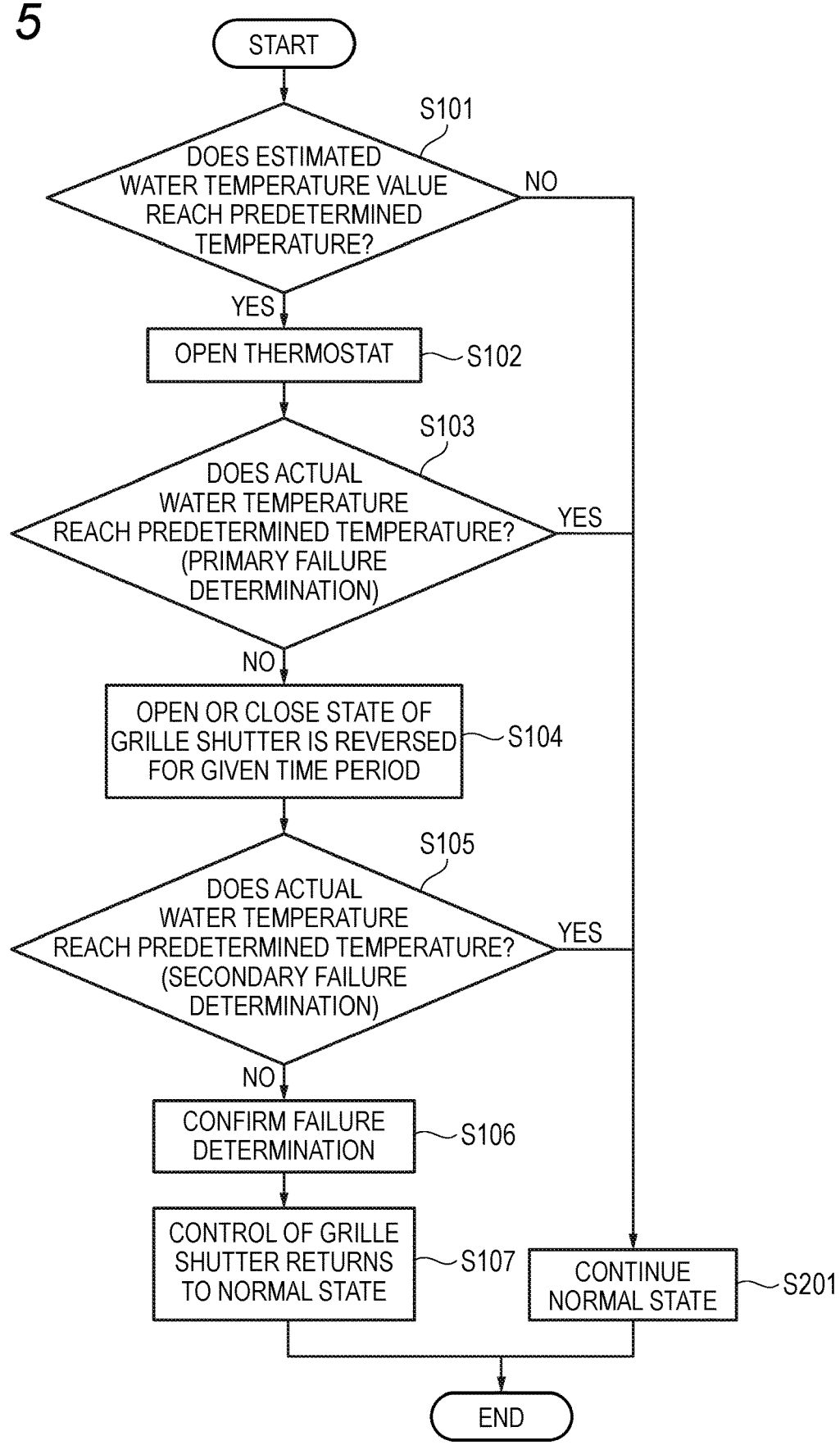
FIG. 5 is a flowchart illustrating an example of an operation of the control unit.

Specifically, as illustrated in FIG. 5, at the primary failure determination time t1, the open or close state of the grille shutter 21 is switched to the opposite state to the open or close state before the time t1 and the switched open or close state is maintained for the given time Δt (Step S104).

The failure determiner 30 maintains the open or close state for the given time Δt while reversing the open or close state of the grille shutter 21 at the primary failure determination time t1, and then the failure determiner 30 performs the failure determination of the thermostat 20 again at a secondary failure determination time t2 at which a secondary failure determination is performed after a given time Δt elapses from the primary failure determination time t1 (Step S105).

The secondary failure determination may be made based on whether the actual water temperature reaches the predetermined temperature (for example, the thermostat opening temperature T1 in the embodiment), as similar to the case of the primary failure determination.

When the open or close state of the grille shutter 21 is reversed as described above, for example, if it is assumed that the grille shutter 21 is in the closed state at the stage before the primary failure determination time t1 according to FIG. 5, the temperature change when the grille shutter 21 is in the closed state is reflected in the estimated temperature at the primary failure determination time t1.

The temperature change when the grille shutter 21 is in the open state is reflected in the estimated temperature at the secondary failure determination time t2.

If the grille shutter 21 at the primary failure determination time t1 is in the open state, the determination is made when the temperature change in the open state is reflected in the primary failure determination and the temperature change in the closed state is reflected in the secondary failure determination.

That is, by checking the deviation between the estimated temperature and the actual water temperature through the primary failure determination and the secondary failure determination, the failure determination of the thermostat 20 can be performed with "taking into account the temperature change of the cooling water based on the open or close state of the grille shutter 21".

In such primary failure determination and secondary failure determination, the several temperature changes in the same control state are not simply referred, but the change in temperature change due to the operation of the grille shutter 21 and the control aspect may be considered by reversing the open or close state of the grille shutter 21. As a result, the failure determination of thermostat 20 is performed more accurately.

When the secondary failure determination is finished, the failure determination of the thermostat 20 is determined (Step S106).

When the actual water temperature rises and reaches the thermostat opening temperature T1 until the time becomes the secondary failure determination time t2, the failure determiner 30 determines that the thermostat 20 is normal (Step S201).

When the failure determination by the failure determiner 30 is finished, the grille shutter 21 returns to the normal state in which the open or close state is controlled again by the vehicle speed (Step S107).

The result of the failure determination may be notified to a driver by a display (not illustrated) mounted on the vehicle 100 or the failure notification may be communicated via a network or the like.

The given time Δt from the primary failure determination time t1 to the secondary failure determination time t2 is determined by the deviation ΔT between the estimated water temperature and the actual water temperature at the primary failure determination time t1 in this embodiment. The reference value of the given time Δt may be set to any value according to the configuration of the thermostat 20 and the radiator 13.

Here, a case where the difference between the estimated water temperature and the actual water temperature is large is considered as, in other words, a case where the possibility of failure is higher, that is, a case where the temperature control is not successful, since the water temperature cannot be estimated correctly at the primary failure determination time t1.

Therefore, when the deviation ΔT is large, it is considered that the diagnosis accuracy of the primary failure determination is high. Therefore, accurate failure determination can be performed more quickly by shortening the given time Δt.

However, when the deviation ΔT between the estimated water temperature and the actual water temperature at the primary failure determination time t1 is small, it is considered that the diagnostic accuracy is still insufficient with the primary failure determination alone, so the time required for the failure determination can be sufficiently taken to improve accuracy.

Specifically, in a case where, as an actual water temperature A in which the deviation ΔT between the estimated water temperature and the actual water temperature is smaller than the predetermined value, the temperature follows a transition as illustrated by the solid line in FIG. 4, it is desirable to secure a long holding time of the grille shutter 21 and to lengthen the given time Δt to further improve the diagnostic accuracy in the secondary failure determination as illustrated by the solid line in the same drawing.

On the other hand, in a case where, as an actual water temperature B in which the deviation ΔT between the estimated water temperature and the actual water temperature is greater than the predetermined value, the temperature follows a transition as illustrated by the one-dot chain line in FIG. 4, it is desirable to secure a short holding time of the grille shutter 21 and to shorten the given time Δt to further improve the quickness in the secondary failure determination as illustrated by the one-dot chain line in FIG. 4.

Alternatively, in a case of the transition such as the actual water temperature B, the diagnosis may be determined only by the primary failure determination. As described above, even when the failure determination of the thermostat 20 is performed only by the primary failure determination, the estimated water temperature value is calculated by "considering the open or close state of the grille shutter 21".

As described above, by changing the given time Δt between the primary failure determination time t1 and the secondary failure determination time t2 based on the actual water temperature and the estimated temperature, the quickness can be emphasized when the accuracy of the failure determination is high and the failure determination can be performed with emphasizing the accuracy when the accuracy is relatively low.

In the embodiment, when the deviation ΔT between the estimated water temperature and the actual water temperature at the primary failure determination time t1 is small, the time required for the failure determination is sufficiently taken to improve the accuracy.

Such a configuration further improves the accuracy of the failure determination.

The preferred embodiment of the present invention is described above. However, the present invention is not limited to such a specific embodiment and various modifications and changes can be made within the scope of the spirit of the invention described in the claims unless as long as it is not specifically limited by the above description.

For example, only a case of the vehicle including an engine is described in the embodiment. However, it may be used for a hybrid vehicle or the like using a motor as a drive source.

In the embodiment described above, although the expressions of the primary failure determination time and the secondary failure determination time are used to simplify the explanation, the implementation of the primary failure determination and the secondary failure determination may be performed within a time having a predetermined width.

The effects described in the embodiment of the invention only list the most preferable effects resulting from the invention and the effects by the invention are not limited to those described in the embodiment of the invention.

What is claimed is:

1. A vehicle, comprising:
   a radiator that cools cooling water;
   a grille shutter that is provided on a vehicle front side of the radiator and opens or closes a grille provided in a vehicle;
   a first flow path in which the cooling water passes through the radiator;
   a second flow path in which the cooling water does not pass through the radiator;
   a thermostat that switches a path between the first flow path and the second flow path;
   a sensor that detects a speed of the vehicle; and
   a failure determiner that performs failure determination of the thermostat based on an actual temperature of the cooling water and an estimated temperature of the cooling water, the estimated temperature being calculated based on a temperature change of the cooling water of increasing or decreasing by an open or close state of the grille shutter in a travelling state of the vehicle, the grille shutter opening or closing the grill in accordance with the speed of the vehicle detected with the sensor,
   wherein the failure determiner is configured to:
   when the estimated temperature exceeds the given value, determine whether the actual temperature of the cooling water exceeds a given value as a primary failure determination, and then determine the thermostat as a temporary failure if the actual temperature of the cooling water exceeds the given value;
   when a given time elapses after the temporary failure determination is determined by the primary failure determination, determine again whether the actual temperature of the cooling water exceeds the given value as a secondary failure determination for performing again the failure determination of the thermostat, and then determine the thermostat as a failure if the actual temperature of the cooling water does not exceed the given value, or determine the thermostat as being normal if the actual temperature of the cooling water exceeds the given value.

2. The vehicle according to claim 1, wherein the failure determiner performs:
   the secondary failure determination while a state where the open or close state of the grille shutter during the primary failure determination is reversed is held.

3. The vehicle according to claim 2, wherein the given time is set based on a difference between the actual temperature when the primary failure determination is performed and the estimated temperature.

4. The vehicle according to claim 3, wherein the given time becomes longer as a deviation between the actual temperature and the estimated temperature when the primary failure determination is performed becomes smaller.

* * * * *